United States Patent [19]

Kurata et al.

[11] Patent Number: 4,543,587

[45] Date of Patent: Sep. 24, 1985

[54] THERMAL HEAD DRIVING SYSTEM

[75] Inventors: Masami Kurata; Toshiharu Inui, both of Kanagawa, Japan

[73] Assignee: Fuji Xerox Co., Ltd., Tokyo, Japan

[21] Appl. No.: 458,081

[22] Filed: Jan. 14, 1983

[30] Foreign Application Priority Data

Jan. 20, 1982 [JP] Japan .................................. 57-6131

[51] Int. Cl.$^4$ ............................................ G01D 15/10

[52] U.S. Cl. ................................ 346/76 PH; 400/120

[58] Field of Search .................... 346/76 PH; 400/120

[56] References Cited

U.S. PATENT DOCUMENTS 4,409,600 10/1983 Minowa ......................... 346/76 PH 4,454,516 6/1984 Moriguchi et al. ............ 346/76 PH

*Primary Examiner*—Thomas H. Tarcza

*Assistant Examiner*—Gerald E. Preston

*Attorney, Agent, or Firm*—Sughrue, Mion, Zinn, Macpeak & Seas

[57] ABSTRACT

A thermal recording apparatus operates to efficiently utilize a smaller capacity power supply by the provision of a capacitor in parallel with the power supply source. The capacitor is discharged during printing cycles and is recharged in the interval between the end of one line printing operation and the beginning of the next. This interval is increased in proportion to the percentage of black bits printed in a given line, such that the capacitor may be sufficiently charged and the power supply efficiently used.

8 Claims, 6 Drawing Figures

THERMAL HEAD DRIVING SYSTEM

BACKGROUND OF THE INVENTION

This invention relates to a system for driving a thermal head employed in a thermal recording apparatus.

In a heat-sensitive recording apparatus or thermal transfer type recording apparatus, the thermal head is selectively driven to record video data. The driving of a thermal head is, in general, limited by the power supply capacity. Let us consider a thermal head which records a line with 1728 dots. Assuming that, in recording data, with this thermal head, a current of 40 mA is required per dot, when a line is recorded in two printing cycles (i.e., using a two-cycle printing system), it can be determined from simple multiplication that the power supply capacity must be 34.6 A. The provision of a power source having such a large capacity is not economical, and may prevent miniaturization of the apparatus.

In order to overcome these difficulties, a system in which the thermal head is driven in a divisional manner, with the number of cycles being determined from the ratio of the current required to allow all the heat generating elements of the thermal head to generate heat simultaneously to the power source capacity, has been proposed in the art. However, the system is disadvantageous in that the recording speed is made low because the thermal head is driven uniformly in a divisional manner.

In order to eliminate the above-described drawback, another thermal head driving system is known in the art in which the number of printing cycles is changed according to the number of dots to be printed. In this system, when the number of dots to be printed corresponds to a current value which meets or is less than the power source capacity of the recording apparatus, a two-cycle printing operation, for example, (the general recording operation) is carried out. When the number of dots to be printed would exceed the power source capacity, the printing operation is carried out using an increased number of cycles (four cycles, eight cycles, sixteen cycles and so forth) depending on the number of dots to be printed. Accordingly, in this system, it is impossible to only slightly change the number of printing cycles. Therefore, at worst, when the number of dots to be printed is increased merely by one, the number of cycles is doubled and accordingly the recording speed is reduced to half. That is, this system is low in power source usage efficiency and is insufficient in recording speed.

SUMMARY OF THE INVENTION

In view of the foregoing, an object of this invention is to provide a thermal head driving system for a recording apparatus with a power source having a relatively small capacity, in which, irrespective of the number of dots to be printed, the power source is efficiently utilized to perform recording operations at high speed.

The foregoing object and other objects of the invention have been achieved by the provision of a thermal head driving system in which, according to the invention, a capacitor is connected in parallel with the output side of a DC source, so that the DC source and the capacitor supply current to the thermal head, and the charging time of the capacitor is changed by a period of time corresponding to the amount of discharge of the capacitor, which changes according to the number of dots to be printed, whereby the utilization efficiency of the DC source is increased.

DETAILED DESCRIPTION OF THE PREFERRED EMBODIMENTS

Figure 1:
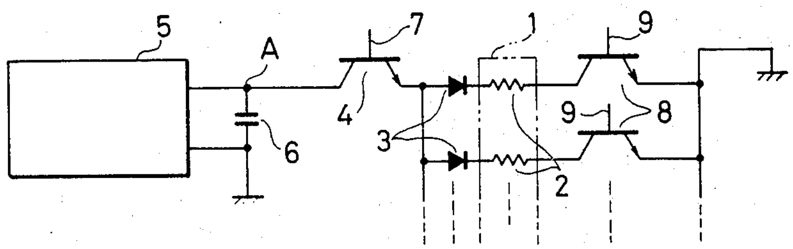
FIG. 1 is a circuit diagram showing the essential components of an electrical circuit of a recording apparatus according to this invention.

FIG. 1 shows the essential components of an electrical circuit of a recording apparatus according to the invention. In this apparatus, one end of each heat generating element 2 of a thermal head 1 is connected through a diode 3 to a common source driver 4. Current for driving the thermal head 1 is applied to the source driver 4 by a DC source 5 and a large capacity capacitor 6 connected in parallel with the output side of the DC source. The source driver 4 comprises a switching transistor. Driving current is supplied to the thermal head only during the period in which a drive pulse, indicated at 7, is applied to the base of the switching transistor.

The other ends of the heat generating elements 2 are connected to sink drivers 8 comprising switching transistors. Video signals, indicated at 9, in the main scanning direction of the recording apparatus, are applied to the sink drivers 8, respectively. In response to these video signals, the sink drivers 8 are selectively switched on and off, so that the heat generating elements 2 are selectively energized, to achieve the thermal recording operation.

Figure 2:
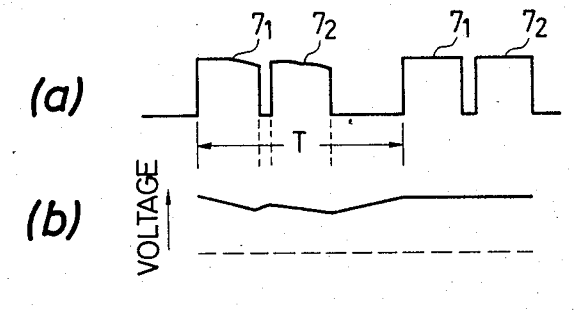
FIG. 2 is a voltage waveform diagram describing the relation between drive pulses and capacitor charge and discharge operations.

In this thermal recording system, a two-cycle printing system is employed in which two drive pulses 7 are produced in recording a line, as shown in part (a) of FIG. 2, in which the pulse width of the first drive pulse $7_1$ is 1 ms, and that of the second drive pulse $7_2$ is 0.9 ms. When the thermal head 1 is driven by the drive pulses $7_1$ and $7_2$, its substrate is heated. The recording sheet is shifted prior to recording the next line. Accordingly, a time period for heat radiation and shifting the recording sheet is provided before the next recording operation is started. The period of time (repetition period) for recording one line, including the time period described above will be represented by T. The capacitor 6 should be discharged during the period of time when drive pulses $7_1$ and $7_2$ are provided in the period T, and should be charged as much as required for recording the next line during the remaining period of time. Part (b) of FIG. 2 shows the variation of the voltage at the positive terminal A of capacitor 6 (FIG. 1) due to the above-described charging and discharging operation.

Figure 3:
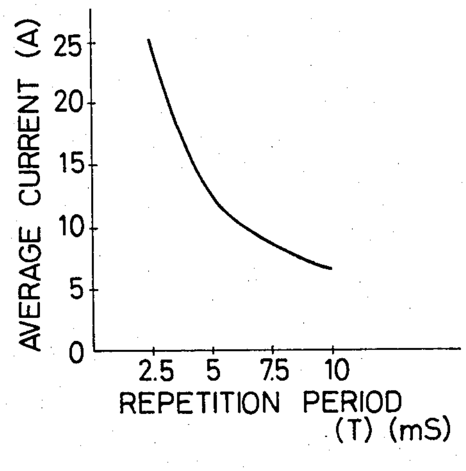
FIG. 3 is a characteristic diagram showing one example of the relation between the repetition period and the average currents applied to all the heat generating elements.

In the system according to the invention, the DC source 5 as well as the capacitor 6 supply current to the thermal head 1. Accordingly, the required current supply of the DC source 5 can be decreased by increasing the repetition period T. FIG. 3 indicates the variation of the average, per unit time, of the current supplied to all heat generating elements (or the average currents), i.e., the variation of the current supply mentioned above, in the case where the minimum repetition period T is set to 2.5 ms. It is apparent from FIG. 3 that, when the capacity of the power source is limited, the repetition period T should be increased, and that, by continuously changing the repetition period according to the number of dots to be printed, the DC source can be maximally utilized to effectively supply current.

Figure 4:
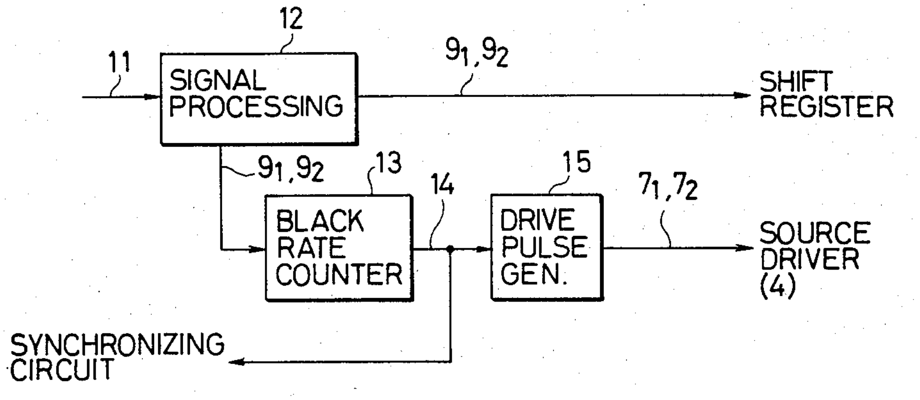
FIG. 4 is a block diagram showing an electrical circuit of a video signal processing section.

FIG. 4 shows an electrical circuit of a video signal processing section, which is used for efficient utilization of the DC source. A video signal 11, which is binary-coded according to the density distribution of an original, is supplied to a video signal processing circuit 12. In the circuit 12, serial video signals for one line as obtained by raster scanning are rearranged according to the thermal head driving system employed. In this case, a two-cycle printing system is employed in which, in each cycle, with respect to one continuous heat generating body, a recording operation is carried out at every other bit. Therefore, in the video signal processing circuit 12, serial video signals of 1728 bits per line are alternately thinned to leave every other bit (e.g. divided into odd and even bits) to provide first and second video signals $9_1$ and $9_2$. The first video signals $9_1$ are supplied to a shift register (not shown), where they are subjected to a serial-parallel conversion. The video signals thus rearranged are applied to the sink drivers 8 of FIG. 1, so that the first cycle of the line recording process is accomplished. Similarly, the second video signals $9_2$ are applied to the shift register, and the second cycle of the process of recording the same line is carried out.

The first and second video signals $9_1$ and $9_2$ outputted by the video signal processing circuit 12 are also applied to a black rate counting circuit 13. The black rate counting circuit 13 operates to count the number of bits representative of black picture elements in the video signals $9_1$ and $9_2$ (i.e., the number of "black" bits), and to output this number as a count value signal 14. The count value signal 14 is supplied, as a synchronizing signal for line synchronization, to a synchronizing circuit (not shown), and is further supplied to a drive pulse generating circuit 15.

In the drive pulse generating circuit 15, the first drive pulse $7_1$ is generated for 1 ms, and is applied to the source driver 4, so that the above-described recording operation using the first video signals $9_1$ is carried out; and then the second drive pulse $7_2$ is generated for 0.9 ms, so that a recording operation using the second video signals $9_2$ is conducted. Therefore, when the repetition period T has passed after the rise of the first drive pulse $7_1$, the drive pulse generating circuit 15 produces drive pulses $7_1$ and $7_2$ for the next line. The period T is varied by the count value signal 14.

Where the capacity of the DC source 5 is 10A and the black rate, which is the ratio of the number of black bits to the number of printable dots, is represented by $R_B$, the relationship between this data and the repetition period T is:

$$T = (1 + 0.9)\, R_B \cdot \frac{33.6}{10}$$

-continued $$= 1.9\, R_B \frac{33.6}{10}\ (\text{ms})$$

In this embodiment, the minimum value of the repetition period T is set to 2.5 ms. Therefore, as is clear from the above relation, the black rate $R_B$ may be up to around 0.39 (39%) at this speed.

Figure 5:
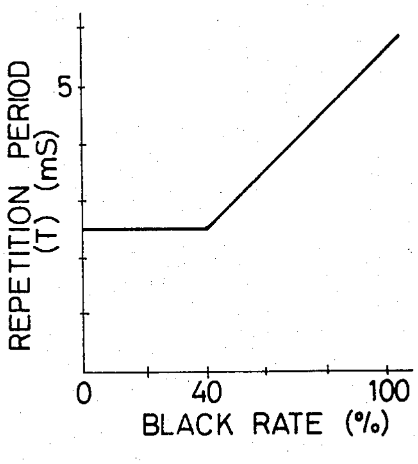
FIG. 5 is a characteristic diagram showing one example of the relation between black rates and repetition periods T.

FIG. 5 indicates the relationship between the black rate $R_B$ and the repetition period T. Setting of the period T with respect to the black rate determined by the count value signal 14 as shown in FIG. 5 can be realized by providing an arithmetic unit adapted to calculate T values from the aforementioned equation, in the drive pulse generating circuit 15. As the black rate becomes larger than 39%, the repetition period T is gradually increased, so that the voltage of the capacitor 6 may be restored to a predetermined value before the next line is recorded. As the repetition period T is continuously changed so that the DC source 5 supplies a current of 10 A at all times, the thermal head is most efficiently driven.

Figure 6:
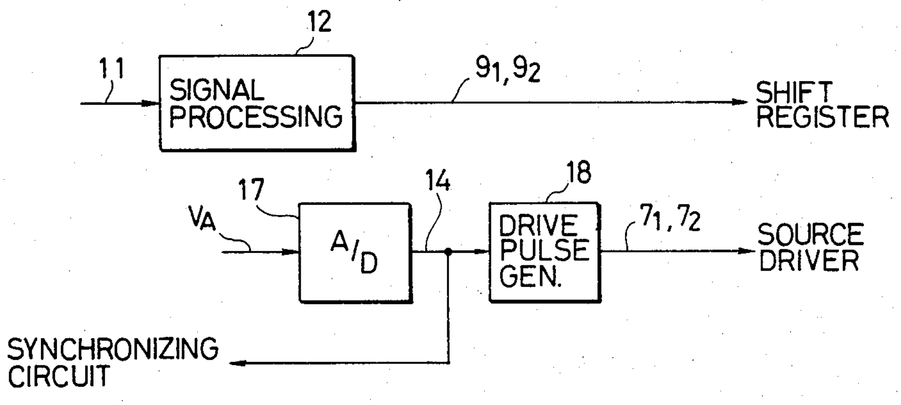
FIG. 6 is a block diagram showing one modification of the image signal processing section.

FIG. 6 shows an alternative arrangement of the electrical circuit of the video signal processing section, for describing one modification of the thermal head driving system. In this modification, the voltage V at the positive terminal A in FIG. 1 is converted into a digital signal 14 by an A/D (analog-to-digital) converter 17. The digital signal 14 is applied to the synchronizing circuit (which operates similarly to that of the above-described embodiment) and to a drive pulse generating circuit 18. The drive pulse generating circuit 18 monitors the voltage V at the terminal A of the capacitor 6, so as to produce drive pulses $7_1$ and $7_2$ for the next line when the voltage V is restored to a predetermined value. However, it should be noted that in case the voltage V is restored before the shortest repetition period has elapsed, the circuit 18 provides the drive pulses $7_1$ and $7_2$ for the next line only after the lapse of the minimum repetition period. In this modification, the period T is again continuously changed, so that the thermal head is efficiently driven.

As is apparent from the above description, according to the invention, limitations in the power supply capacity are overcome by varying the printing cycle repetition period. Therefore, the system of this invention can record a given line using a relatively small number of printing cycles when compared with a system in which the number of cycles is changed. Accordingly, the circuit for driving the thermal head in a divisional manner is made unnecessary or can be simplified. Furthermore, even when recording on a recording sheet which is in motion, the problem of the dots being printed such that they are greatly shifted in the auxiliary scanning direction is not caused. Thus, the recorded image is of improved quality.

What is claimed is:

1. A thermal head driving system for a recording apparatus, comprising; a DC power source, charge and discharge capacitor means between said DC source and a thermal head for performing thermal recording operations in a line by line manner, said thermal recording taking place during the discharge of said capacitor means, said capacitor means being charged by said DC source to supply drive current to said thermal head, and means for varying the time during which said capacitor means is charged to correspond to the degree to which said capacitor will be discharged in recording a given line.

2. A system as claimed in claim 1, wherein said varying means comprises means for determining the ratio of video signals to be printed from among those of a given line, said ratio being utilized to provide a charge time for said capacitor means valid until the next line is recorded.

3. A system as claimed in claim 1, including means for suspending driving of said thermal head to record a next line until a charge voltage of said capacitor reaches a predetermined value.

4. A thermal head driving system, comprising; a DC power source, capacitor means connected in parallel with said power source, means for determining the ratio of printable video signals from among a plurality of video signals for one printing line, and means for determining a charging time for said capacitor means in response to the magnitude of said ratio.

5. A system as claimed in claim 4, wherein said charging time is determined so as to allow sufficient charge recovery of said capacitor means following the printing of said one printing line.

6. A system as claimed in claim 4, said charging time determining means including drive pulse generator means for said thermal head, and arithmetic means for calculating a printing repetition period on the basis of said ratio.

7. A system as claimed in claim 4, said ratio determining means comprising a black rate counting circuit receiving serial video signals and counting the number of said signals representative of black picture elements.

8. A system as claimed in claim 4, said charging time determining means comprising conversion means for converting a capacitor terminal voltage to a digital signal, and drive pulse generating means for monitoring said voltage and for producing drive pulses only when said voltage is restored to a predetermined value.

* * * * *